United States Patent [19]

Gavrun et al.

[11] 4,058,321
[45] Nov. 15, 1977

[54] OIL SEAL CONSTRUCTION FOR ROTARY MECHANISMS

[75] Inventors: Michael T. Gavrun, Bayonne; Robert W. Loyd, Jr., Wyckoff, both of N.J.

[73] Assignee: Curtiss-Wright Corporation, Wood-Ridge, N.J.

[21] Appl. No.: 731,691

[22] Filed: Oct. 12, 1976

[51] Int. Cl.² .............................................. F16J 15/34
[52] U.S. Cl. ................................... 277/81 P; 277/96; 277/136; 418/61 A; 418/142
[58] Field of Search .............. 277/81 P, 81 R, 96, 277/96.1, 136; 418/142, 61 R, 61 A

[56] References Cited

U.S. PATENT DOCUMENTS

| | | |
|---|---|---|
| 3,309,011 | 3/1967 | Osakada et al. ............... 418/142 |
| 3,400,939 | 9/1968 | Jones ............................ 277/81 R |
| 3,456,624 | 7/1969 | Okamoto ........................ 418/142 |
| 3,479,040 | 11/1969 | Tracy ............................. 277/81 R |
| 3,853,440 | 12/1974 | Green ............................ 418/142 |
| 3,976,407 | 8/1976 | Gerlach ......................... 277/96 |

Primary Examiner—Richard E. Aegerter
Assistant Examiner—L. Footland
Attorney, Agent, or Firm—Victor D. Behn; Arthur Frederick

[57] ABSTRACT

An oil seal construction for a rotary mechanism including a seal ring receivable in an annular groove in an end face of the rotor of said mechanism with the ring having a pair of radially-spaced annular surfaces for sealing engagement with the adjacent side housing and with a ring of elastomeric material disposed in said oil seal groove behind the seal ring and also including a metallic spring disposed behind the elastomeric ring such that the metallic spring forces act through the elastomeric ring to urge the seal ring outwardly of the rotor groove.

4 Claims, 6 Drawing Figures

OIL SEAL CONSTRUCTION FOR ROTARY MECHANISMS

BACKGROUND OF THE INVENTION

The invention relates to rotary mechanisms for fluid pumps, expansion engines, internal combustion engines and the like. In particular, the invention is directed to an improvement in the side seals for such mechanisms.

U.S. Pat. No. 3,853,440 granted Dec. 10, 1974 to Green, and U.S. Pat. No. 3,180,563 granted Apr. 27, 1965 to Jones et al., are typical of prior art side oil seals carried by an end face of the rotor or inner body of a rotary mechanism (shown in these patents as a rotary combustion engine) for sealing engagement with the adjacent end wall of the housing. In such prior art oil seals, it is desirable to make the seal flexible enough for its sealing edge to follow any deviations of the housing side wall surface from a flat condition, for example, because of thermal distortions. However, if the seal ring is provided with such flexibility, then, particularly because of the planetary motion of the rotor relative to the housing with resulting frictional and centrifugal effects as well as differential pressure on the seal ring, there is a tendency for the seal ring to twist or roll about its circumferential axis relative to the housing side wall engaged by the seal thereby causing its side wall engaging seal edge to have non-continuous contact with the housing side wall with resulting leakage. Also, in these prior patents, a metallic spring acts directly on the seal ring and therefore, becuase of manufacturing tolerances, it is difficult to provide uniform circumferential distribution of the spring force around the seal ring. Any such non-uniform distribution of the spring force accentuates any tendency of the seal to twist.

SUMMARY OF THE INVENTION

It is an object of the invention to provide a novel side seal configuration for the rotor of a rotary mechanism in which the foregoing prior art difficulties with such seals are minimized.

It is a further object of the invention to provide a side seal configuration in which the seal ring has a one-piece construction with a pair of radially-spaced annular seal surfaces for engagement with the housing side wall and the axial spring force acting on said seal ring is applied axially against the seal ring radially between (preferably approximately midway) its radially-spaced annular seal surfaces. Preferably, this spring force is applied to the seal ring, through a co-axial ring of elastomeric or rubber-like material which also functions as a secondary seal to restrict leakage around the rear of the seal ring.

U.S. Pat. No. 3,309,011 granted Mar. 14, 1967 to Osakada et al. discloses in FIG. 4 an oil seal for the rotor of a rotary mechanism in which the spring force on the seal ring is applied through an elastomeric ring. However, in this latter patent, the seal ring spring force is radially offset from its single seal edge thereby tending to cause the seal ring to twist about its circumferential axis.

U.S. Pat. No. 3,171,590 granted Mar. 2, 1965 to Bentele et al. discloses, in FIG. 9, a one-piece oil seal for a rotary mechanism in which the oil seal ring has two annular seal edges for engaging the adjacent side wall of the engine housing. In this latter patent, however, an elastomeric ring provides the only spring force against the seal ring and, therefore, it is not possible to provide the desired low axial spring force against the seal ring over the desired range of axial motion of the seal ring. This difficulty is made even greater because of the problem of manufacturing tolerances in fabrication of the elastomeric ring and because of wear of the elastomeric ring during operation as well as because of any permanent set the elastomeric ring may take.

With the seal ring construction of the present invention, the cross-section and axial dimension of the seal ring can be made sufficiently small to provide the desired flexibility so that the seal ring can follow any unevenness of the housing side wall and yet the seal ring is sufficiently stable so as not to roll or twist relative to the housing side wall. Also by applying the axial spring force against the seal ring through an elastomeric ring, a uniform axial force around the ring is insured. At the same time, by applying this uniform axial force radially between the two annular seal surfaces of the seal ring, a very stable seal structure is provided which, notwithstanding the flexibility of the seal ring, resists any twisting of the seal ring and yet provides an adequate seal force over a sufficiently large range of axial motion of the seal ring. In addition, the elastomeric ring is arranged to provide a secondary seal to restrain leakage around the back of the seal ring and at the same time the arrangement minimizes the contact pressure between the elastomeric ring and the side wall of the rotor groove in which the side seal is received.

Other objects of the invention will become apparent upon reading the annexed detail description in connection with the drawings.

DESCRIPTION OF PREFERRED EMBODIMENT

Figure 1:
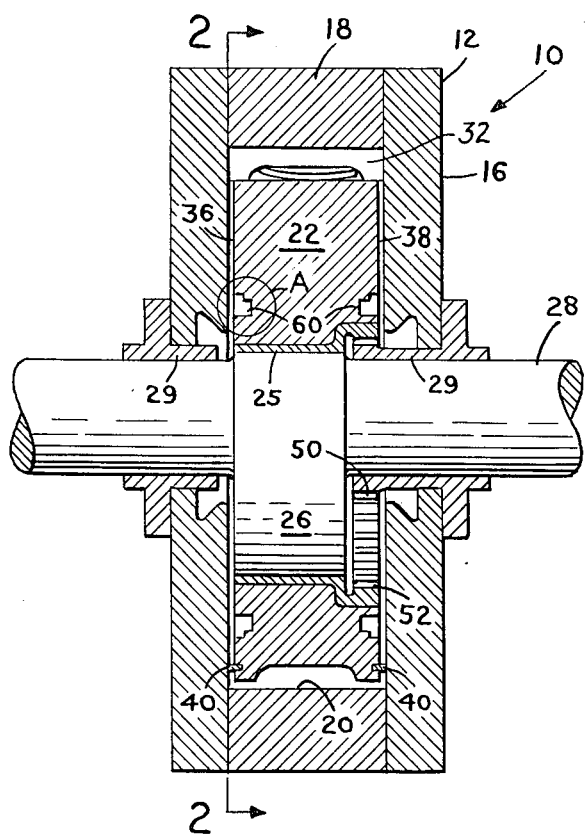
FIG. 1 is an axial sectional view through a rotary combustion engine embodying the invention.
Figure 2:
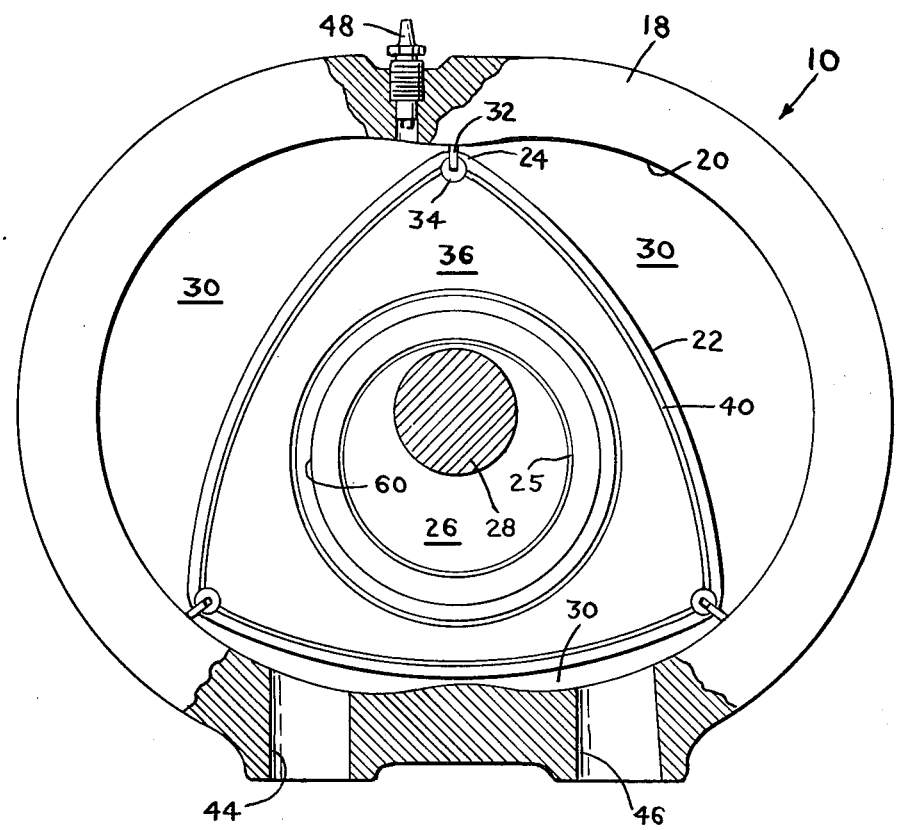
FIG. 2 is a transverse sectional view taken along line 2—2 of FIG. 1.

Referring first to FIGS. 1 and 2 of the drawing, a rotary combustion engine, schematically indicated at 10, has an outer body or housing 12 consisting of two axially-spaced end housings 14 and 16 and an intermediate or rotor housing 16 to form the engine cavity therebetween. The peripheral or inner surface 20 of the rotor housing 18, as viewed in FIG. 2, has a multi-lobe profile which preferably is essentially an epitrochoid and, as illustrated, has two lobes.

An inner body or rotor 22 having a plurality of apex portions 24 is disposed within the engine cavity and is journaled by a bearing 25 on the eccentric portion 26 of a shaft 28 having its axis extending co-axially through the end housings 14 and 16. Bearings 29 are provided for supporting the shaft 28 in the end housings 14 and 16. Bearings 29 are provided for supporting the shaft 28 in the end housings 14 and 16. With the housing peripheral surface 20 being a two-lobed epitrochoid, the rotor 22 has a generally triangular profile. The apex portions 24 of the rotor 22 have sealing cooperation with the peripheral inner surface 20 of the rotor housing 18 to form a plurality of working chambers 30 between the rotor and said surface. For this purpose, each apex portion 24 of the rotor has seal strip means 32 extending thereacross in a groove in said apex portion parallel to the rotor axis. In addition, a cylindrical seal pin 34 is disposed on each end of the rotor apex seal groove and each end face 36 and 38 of the rotor is provided with side seal strips 40 disposed in grooves in their respective rotor end faces and extending between adjacent seal pins. In this way the apex seals 32, the seal pins 34 and the side seal strips 40 form a seal grid around each working chamber 30.

The outer body of the engine is also provided with an intake port 44 and an exhaust port 46 disposed on opposite sides of one of the junctions of the two-lobe peripheral surface 20 and a spark plug 48 is disposed adjacent to the opposite junction of said two lobes. An internal gear 50 is secured to the rotor adjacent one end face of the rotor and a fixed external gear 52 is secured to the adjacent end housing. The gearing 50 and 52 controls the rotation of the rotor relative to the shaft and engine housing.

The construction so far described is conventional and is generally similar to the rotary engine structure of the aforementioned patents. While this configuration of the rotary mechanism 10, the rotor 22 has a planetary motion relative to the housing 12 to cyclically vary the volume of the working chambers 30.

Figure 3:
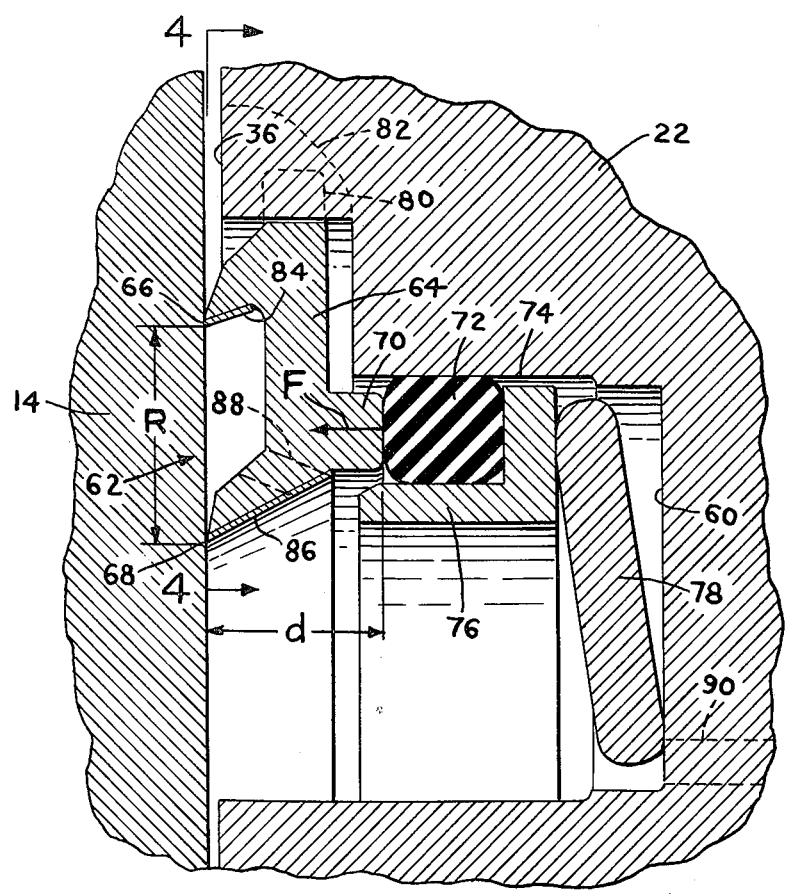
FIG. 3 is a much enlarged view of the portion of FIG. 1 enclosed in the circle A.
Figure 4:
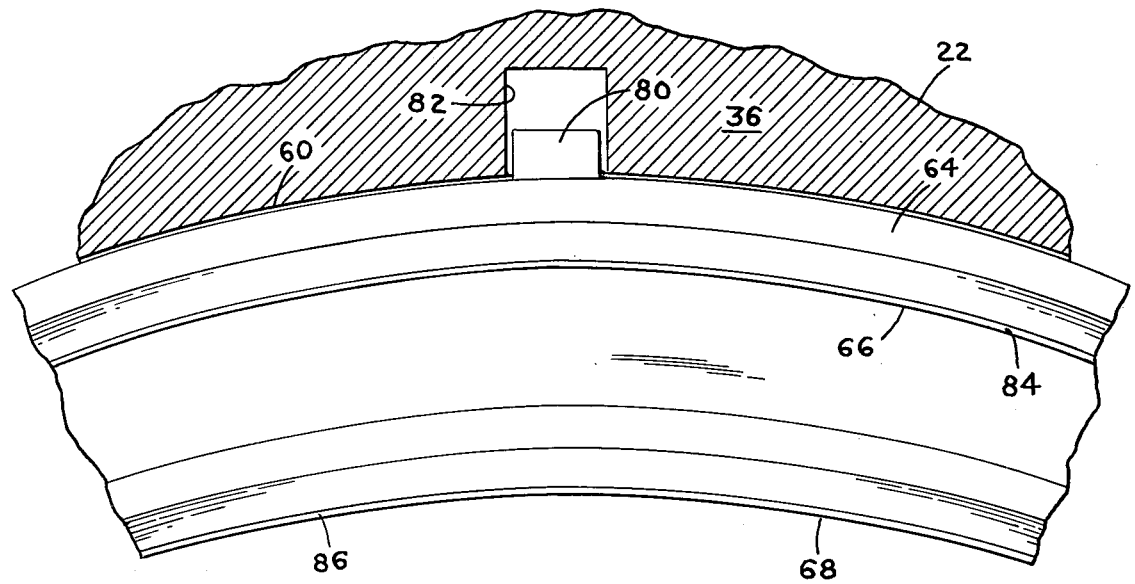
FIG. 4 is a view taken along line 4—4 of FIG. 3.

During engine operation, oil tends to flow radially outwardly from the shaft bearings between the rotor end faces 36 and 38 and the adjacent end housings 14 and 16. To prevent or restrict such oil leakage, each rotor end face is provided with an annular side seal construction. For this purpose, each end face 36 and 38 of the rotor 22 is provided with an annular groove 60 co-axial with the rotor for the reception of the novel annular seal construction 62 to restrict oil flow radially outwardly between the facing surfaces of the rotor and end housings 14 and 16. The details of each groove 60 and its side seal 62 construction is shown in FIGS. 3 and 4. For ease of illustration, the side seals 62 have not been shown in the annular rotor grooves 60 in FIGS. 1 and 2.

As illustrated, each annular groove 60 has an L-shaped cross-section such that the portion of the groove 60 adjacent to its rotor end face has a larger radial dimension than the inner portion of said groove. Each seal construction 62 for each side face of the rotor (shown as the side face 36 in FIG. 3) includes a seal ring 64 which is received within its associated groove 60 and has a pair of radially spaced annular seal surfaces 66 and 68 (preferably sharp edges as shown) for sealing engagement with the adjacent surface of the end housing 14 (or 16). The rear side of the dual seal ring 64 has a short annular projection or flange 70 for engagement with a ring 72 of elastomeric or rubber-like material. The outer diameter of the rubber-like ring 72, in its free condition, is slightly larger than the internal diameter of the adjacent wall portion 74 of the groove 60 thereby insuring contact therebetween. An L-shaped retainer ring 76 is disposed around the rubber-like ring 72, said retainer ring having radial and axial legs engageable respectively with the rear side of the rubber-like ring 72 and with its side opposite to the groove wall 74. For this latter purpose, the axial leg of the retainer ring 76 has an outer diameter somewhat larger than the internal diameter of the rubber-like ring 72 to insure contact therebetween. In this way, the rubber-like ring 72 is confined between the portion 70 of the seal ring 64, the wall portion 74 of the groove 60 and by the legs of the retainer ring 76. An annular belleville washer-type spring 78 is disposed between the bottom of the groove 60 and the rear of the retainer ring 76.

With this configuration of the annular groove 60 and its rotor side seal construction 62, the force of the spring 78 is transmitted axially through the radial leg or flange of the retainer ring 76 to the rubber-like ring 72 from which the spring force is transmitted axially to the portion 70 of the seal ring 64 with an axial force F to press the annular seal portions 66 and 68 against the surface of the adjacent end housing 14 (or 16) thereby providing a seal between the seal ring 64 and the adjacent end housing 14 to prevent radially outward leakage of oil between the associated end face 36 of the rotor and the end housing. The seal ring 64 is provided with a small cross-section and axial dimension to make the seal ring 64 sufficiently flexible so that it can follow and maintain seal contact with the end housing 14 notwithstanding any unevenness of the surface of this end housing resulting, for example, from manufacturing tolerances, wear or thermal distortions. For this latter purpose the radial spacing R of the seal contact regions 66 and 68 of the ring 64 preferably is greater than the axial depth $d$ of the ring 64. In order to further increase the flexibility of the seal ring 64, its axial projection or flange 70 could be made shorter than that illustrated, or even eliminated.

Since the rubber-like ring 72, in transmitting the axial force of the spring 78, is squeezed axially between the radial flange of the retainer ring 76 and the seal ring 64, the rubber-like ring 72 insures that the axial force F of the spring 78 is circumferentially uniformly distributed against the portion 70 of the seal ring 64. Also, as is shown in FIG. 3, the configuration of the seal construction 62 is such that the line of action of the force F exerted on the seal ring 64 through the rubber-like ring 72 (in any section through a plane including the axis of the rotor) preferably passes approximately midway radially between the two portions 66 and 68 of the seal ring 64 engaging the adjacent end housing 12 or 14. Because of differential fluid pressures on the seal ring 64, it may be desirable for the spring force F, although applied radially between the two seal edges 66 and 68, to be offset to one side or the other of radially midway between said edges in order to increase the stability of the seal ring 64.

With this construction, the force F does not tend to tilt or twist the seal ring (relative to the adjacent end housing wall) about either of its regions or edges 66 or 68 of seal contact with the end housing even though the ring is made sufficiently flexible to follow any uneveness of the end housing 14 and has a sliding planetary motion over the adjacent surface of the end housing 14. Also, since the rubber-like ring 72 uniformly distributes the force F circumferentially around the seal ring 64, any tendency for the flexible seal ring 64 to twist because of any non-uniform distribution of the spring force around the seal ring, is minimized.

Since the rubber-like ring 72 is squeezed axially between the radial flange of the retainer ring 76 and the portion 70 of the seal ring 64, the rubber-like ring expands radially into contact with the groove wall portion 74 and into contact with the axial flange of the retainer ring 76. In this way, the rubber-like ring functions as a secondary seal to prevent leakage around behind the seal ring 64.

In order to minimize wear between the seal ring 64 and the rubber-like ring 72, the seal ring 64 preferably is provided with means to prevent relative rotation between the ring 64 and the rotor 22 without inhibiting axial motion of said ring. For this purpose the seal ring 64 is provided with one or more lugs 80, each receivable in a slot 82 in the rotor. The fit between each lug 80 and slot 82 thereby prevents rotation of the ring 64 relative to the rotor 22 without interfering with axial motion of the ring 64. Also, the seal edges 66 and 68 preferably have a hard wear-resistant layer or coating, 84 and 86 respectively, on their radially inner sides so that wear of the area of contact of said seal edges with the adjacent end housing is small whereby, notwithstanding seal wear, each of these edges remain fairly sharp for scraping oil inwardly from the adjacent end housing wall. U.S. Pat. No. 3,456,624 granted July 22, 1969 to Okamoto, discloses a rotary engine oil seal in which the radially inner side of the seal has such a hard wear-resistant layer but in which the seal has only a single scraping edge.

The dual seal ring 64 preferably has one or more holes 88 connecting the inter-seal space between the seal edges 66 and 68 to the seal groove 60 radially inwardly of the seal ring 64. The purpose of the holes 84 is to permit any excess oil accumulating in the annular inter-seal space between the seal edges 66 and 68 to drain radially inwardly as well as to vent this inter-seal space. To facilitate drainage of this excess oil, the bottom of the seal groove 60 may be provided with drain holes 90 to permit the excess oil to drain into the hollow interior of the rotor, for example, as disclosed in U.S. Pat. No. 3,400,939 granted Sep. 10, 1968 to Jones.

Figure 5:
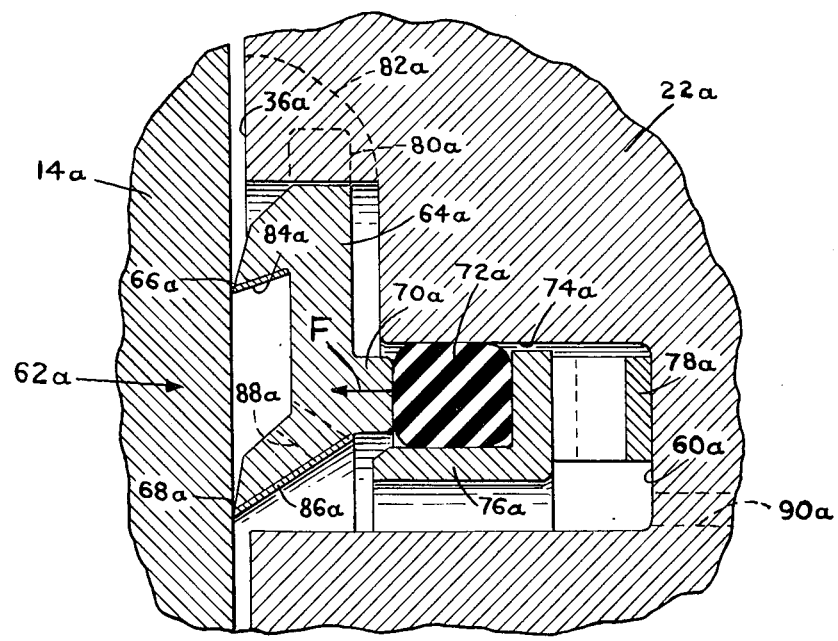
FIG. 5 is a view similar to FIG. 3 but illustrating a modified form of the invention.

FIG. 5 illustrates a modified form of the invention. For ease of understanding, the parts of FIG. 5 have been designated by the same reference numerals as the corresponding parts of FIG. 3 but with a subscript *a* added thereto.

In FIG. 5 an annular wave-type spring 78a has been substituted for the belleville washer-type spring 78 of FIG. 3. With an annular wave-type spring 78a, the required radial dimension of the seal groove 60a is substantially reduced thereby reducing the radial space on each rotor end face required for the oil seals. The operation and function of FIG. 5 is otherwise similar to that of FIG. 3.

Figure 6:
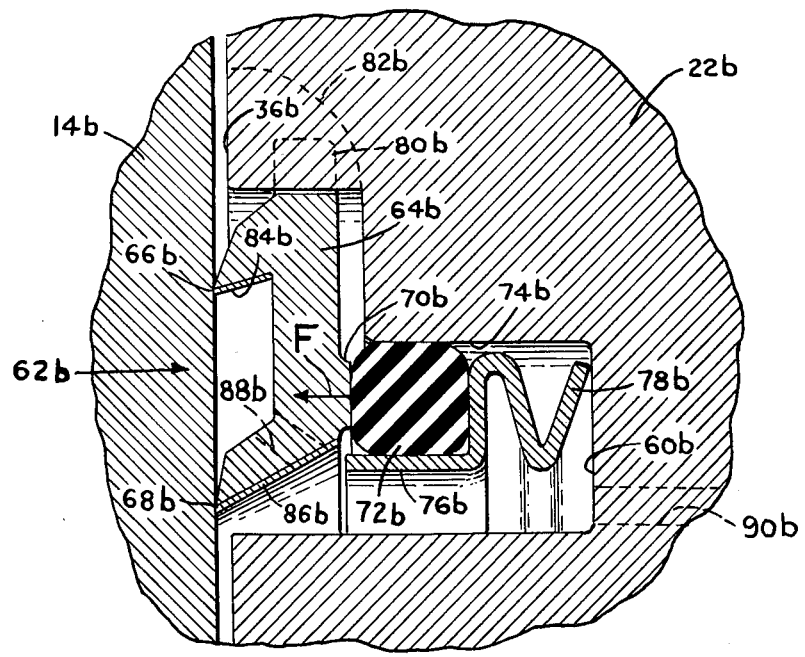
FIG. 6 is another view similar to FIG. 3 but illustrating a further moedified form of the invention.

A further modification of the invention is shown in FIG. 6. For ease of understanding, the parts of FIG. 6 have been designated by the same reference numerals as the corresponding parts of FIG. 3 but with a subscript *b* added thereto.

In FIG. 6, the spring 78b and retainer ring 76b have an integral one-piece construction preferably of sheet metal of spring steel. The spring 78b consists of an annular spring of V-shaped cross-section to provide the axial spring force. Also, in FIG. 6 the rubber-like ring 72b is bonded to the retainer ring 75b. With this construction, the rubber-like ring 72b, retainer ring 76b and spring 78b can be handled as a unitary one-piece structure thereby facilitating assembly of these elements, particularly as compared to FIGS. 3 and 5, where these elements constitute three individual pieces. Also, in FIG. 6 the axial dimension of the seal ring flange 70b has been reduced substantially to increase the flexibility of the seal ring 64b.

As in FIG. 3, in the embodiments of FIGS. 5 and 6, the axial line of action of the spring force F against the seal ring 64a or 64b passes generally midway radially between the two seal ring edges 66a and 68a or 66b and 68b. At the same time, the rubber-like ring 72a or 72b insures that this axial spring force is circumferentially uniformly distributed around the seal ring 64a or 64b.

The invention clearly is not limited to the specific details described. Thus, although the invention has been described in connection with a rotary mechanism functioning as a combustion engine, the invention is also applicable to rotary compressor or expansion engines. Furthermore, the invention is not limited to the specific geometry of the rotary mechanism illustrated. Thus, the invention is applicable to any rotary mechanism in which an inner body has relative rotation in a housing cavity and an annular seal is provided between one or both side faces of the inner body and the side walls of the housing cavity. Accordingly, it should be understood that the invention is not limited to the specific details of construction herein illustrated and that changes and modifications may occur to one skilled in the art without departing from the spirit or scope of the invention.

What is claimed is:

1. A rotary mechanism having a housing with a pair of spaced end walls and an intermediate wall to define a cavity therebetween and a piston rotor mounted for relative rotation within said housing cavity with the end faces of said piston rotor being disposed adjacent to said housing end walls and at least one of said rotor end faces having an annular groove, an annular side seal construction comprising:

a. a one-piece seal ring receivable within said rotor annular groove for axial movement relative thereto and having a pair of radially-spaced, annular, axially-projecting disposed generally at an angle radially inward, and portions having relatively sharp annular outer edges for sealing engagement with the adjacent housing end wall, the overall axial dimension of the seal ring being less than the radial spacing between said annular outer edges of the seal ring;

b. a ring of elastomeric material disposed axially behind said seal ring for engagement therewith and also being engageable with a wall of said rotor groove to minimize leakage around said ring on its side remote from the adjacent housing end wall;

c. annular metallic spring means disposed behind said elastomeric ring for applying an annular axial force against the elastomeric ring for causing the elastomeric ring to engage the adjacent side wall of its groove and to urge the seal ring axially outwardly of said groove with the effective region of application of said axial force on said seal ring being radially between its said radially-spaced annular outer edges, d. an L-shaped annular retainer means disposed adjacent to said elastomeric ring to restrain the elastomeric ring against radial movement away from the rotor groove side wall engageable by said elastomeric ring and for transmitting axial spring force against the elastomeric ring.

2. An annular seal construction as claimed in claim 1 in which said axially-extending retainer means and radially-extending means are a one-piece construction.

3. An annular seal construction as claimed in claim 1 in which the seal ring has a portion engageable with the rotor to restrain relative rotation between the seal ring and rotor.

4. An annular seal construction as claimed in claim 1 in which said axial force is applied approximately midway radially between the radially-spaced annular outer edges of the seal ring and in which each of said axially projecting portions of the seal ring has a hard wear-resistant layer on its radially inward facing surface such that the annular outer edge of each said portion has a relatively hard and sharp scraping edge which remains sharp as the seal wears.

* * * * *